(12) United States Patent
Seo et al.

(10) Patent No.: US 7,609,943 B2
(45) Date of Patent: Oct. 27, 2009

(54) METHOD AND APPARATUS OF RECORDING GRAPHIC DATA ON A RECORDING MEDIUM

(75) Inventors: Kang Soo Seo, Kyunggi-do (KR);
Byung Jin Kim, Kyunggi-do (KR);
Chang Bum Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 794 days.

(21) Appl. No.: 10/759,269

(22) Filed: Jan. 20, 2004

(65) Prior Publication Data

US 2004/0146283 A1 Jul. 29, 2004

(30) Foreign Application Priority Data

Jan. 20, 2003 (KR) .................... 10-2003-0003783

(51) Int. Cl.
*H04N 5/91* (2006.01)
(52) U.S. Cl. ..................... 386/95; 386/98; 386/126
(58) Field of Classification Search .............. 386/46, 386/95, 125, 126, 98, 112
See application file for complete search history.

(56) References Cited

U.S. PATENT DOCUMENTS

| | | | | |
|---|---|---|---|---|
| 3,697,176 A | * | 10/1972 | Kuehnle et al. | 355/45 |
| 5,387,940 A | * | 2/1995 | Kwok et al. | 348/446 |
| 5,758,007 A | * | 5/1998 | Kitamura et al. | 386/45 |
| 6,631,241 B2 | * | 10/2003 | Yamauchi et al. | 386/95 |

FOREIGN PATENT DOCUMENTS

| | | |
|---|---|---|
| KR | 1020010015018 | 2/2001 |
| KR | 1020010086133 | 9/2001 |

OTHER PUBLICATIONS

Digital Video Broadcasting (DVB); Subtitling Systems, Oct. 1997 ETSI ETS 300 743.*
Office Action for corresponding Korean Application No. 10-2003-0003783 dated Mar. 30, 2009.

* cited by examiner

*Primary Examiner*—Huy T Nguyen
(74) *Attorney, Agent, or Firm*—Harness, Dickey & Pierce, P.L.C.

(57) ABSTRACT

The present invention relates to method and apparatus of recording graphic data constituting sub-pictures in a main video on a high-density recording medium such as a Blu-ray Disk ROM (BD-ROM) disk. In the present invention, when a plurality of graphic objects, namely, images are received, the plurality of graphic objects and their color control information are organized into a PES (Packetized Elementary Stream) packet and then recorded on a recording medium, wherein the color control information is used in common for screen display by the plurality of graphic objects.

32 Claims, 8 Drawing Sheets

*Region*

Structure of a PES Packet

- ☐ DTS
- ☐ PTS
- ☐ Multi palette()      ← CLT
- ☐ Multi transparency array()
- ■ *Region_composition_segment()* {
      num_of_objects
      for (i=0; i<num_of_objects; i++) {
          - ■ object_id
          - ■ object_horizontal_position
          - ■ object_vertical_position
      }
  }
- ■ *Object_definition_segment()* {
  - ■ object_id
  - ■ CLT_id
  - ■ PNG_id
  }
- ■ *PNG_segment()* {
  - ■ PNG_id
  - ■ PNG Chunks
  }
- ■ *Display_control_sequences_segment()* {
      for (i=0; i<num_of_display_sequences; i++) {
          *Display_sequence()* {
              - ■ object_id
              - ■ Cut in time & Cut out time of the display control sequence
              - ■ MNG chunk like information
          }
      }
  }

FIG. 7

Structure of a PES Packet

FIG. 8

METHOD AND APPARATUS OF RECORDING GRAPHIC DATA ON A RECORDING MEDIUM

FOREIGN PRIORITY

The present invention claims priority under 35 U.S.C. 119 on Korean Application No. 10-2003-003783 filed Jan. 20, 2003; the contents of which are incorporated by reference in their entirety.

BACKGROUND OF THE INVENTION

1. Field of the Invention

The present invention relates to method and apparatus of recording graphic data constituting sub-pictures in a main video on a high-density recording medium such as a Blu-ray Disk ROM (BD-ROM) disk.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (called 'BD-RE' in general) is one example of these new optical disks.

Figure 1:
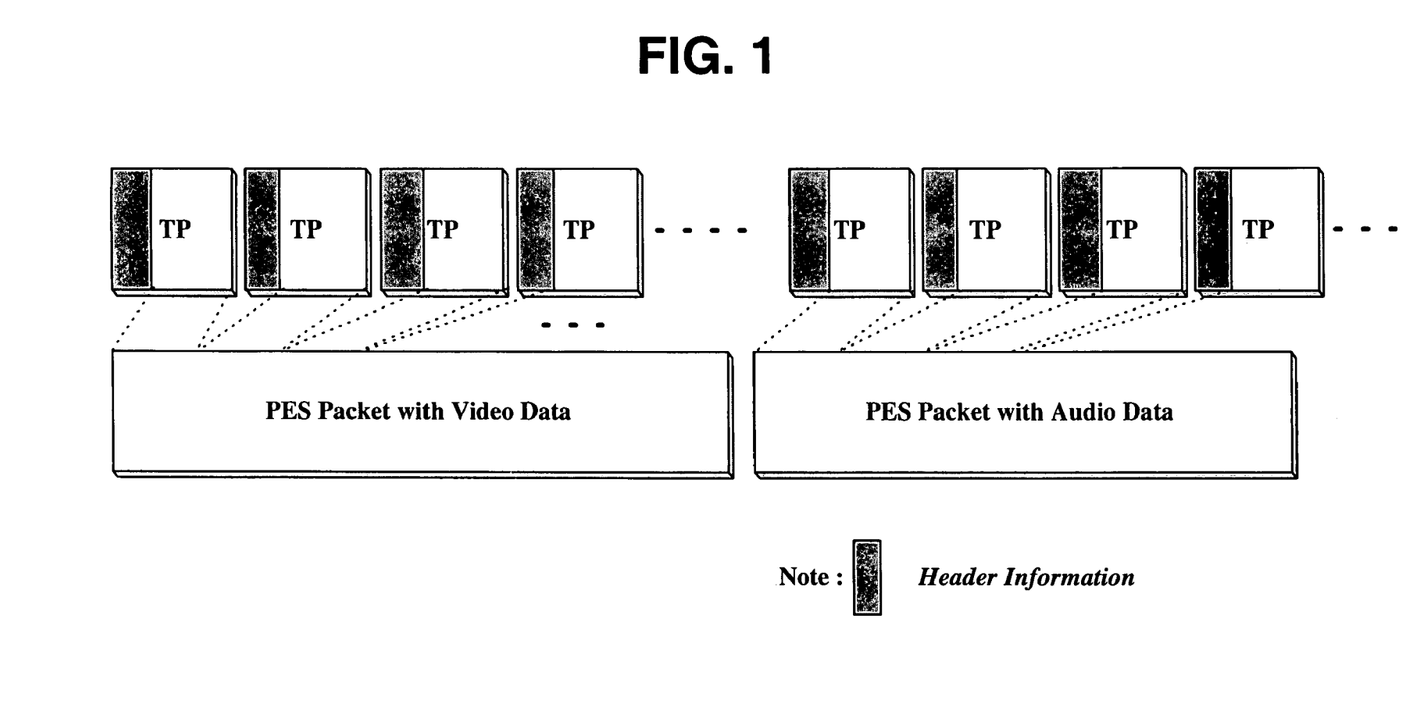
FIG. 1 illustrates a recording example in which video or audio PES packets are recorded in series of transport packets after being sliced.

A digital TV signal is broadcasted and recorded in the form of TS (Transport Stream) on a high-density recording medium such as a BD-RE. The TS is composed of TPs (Transport Packets) and each TP, as shown in FIG. 1, includes a data segment divided from a PES (Packetized Elementary Stream) packet that carries video or audio data. The TS recoded as above is reproduced and transmitted as recorded to a digital TV set or its video/audio data contained in PES packets is decoded to an A/V signal by a disk recording/reproducing apparatus.

On the other hand, the standardization for a high-density read-only optical disk such as a Blu-ray ROM disk (called 'BD-ROM') is still under way. A BD-ROM need to have user interfacing data for reproduction control of video contents recorded thereon.

By the way, user interfacing need graphic data such as buttons and button function descriptive images for user's easy operation. Furthermore, graphic data is also necessary to provide additional information about main video. Therefore, an effective method how graphic data and its display control information are recorded on a high-density recording medium such as a BD_ROM is strongly demanded.

SUMMARY OF THE INVENTION

It is an object of the present invention to provide method and apparatus of organizing graphic data to be displayed on a main video page and its display control information into a PES packet and recording them onto a recording medium.

It is another object of the present invention to provide method and apparatus of organizing graphic data to be displayed on a single video page and its display control information into a single PES packet and recording them onto a recording medium.

It is another object of the present invention to provide method and apparatus of organizing a PES packet to include common color control information on all graphic objects to be displayed on a single video page.

A method of recording graphic data on a recording medium in accordance with the present invention is characterized in that it comprises the steps of: receiving graphic data including a plurality of graphic objects; and organizing the plurality of graphic objects and color control information into a PES (Packetized Elementary Stream) packet and recording the PES packet on the recording medium, wherein the color control information is used in common for screen display by the plurality of graphic objects.

An apparatus of recording graphic data on a recording medium in accordance with the present invention is characterized in that it comprises: first means for receiving video and/or audio data, and graphic data including a plurality of graphic objects; second means for organizing the video and/or audio data into a series of PES packets and organizing the plurality of graphic objects and color control information into a PES packet, wherein the color control information is used in common for screen display by the plurality of graphic objects; and third means for multiplexing the series of video and/or audio PES packets and the PES packet including graphic objects in the unit of transport packet and then recording on a recording medium.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 2:
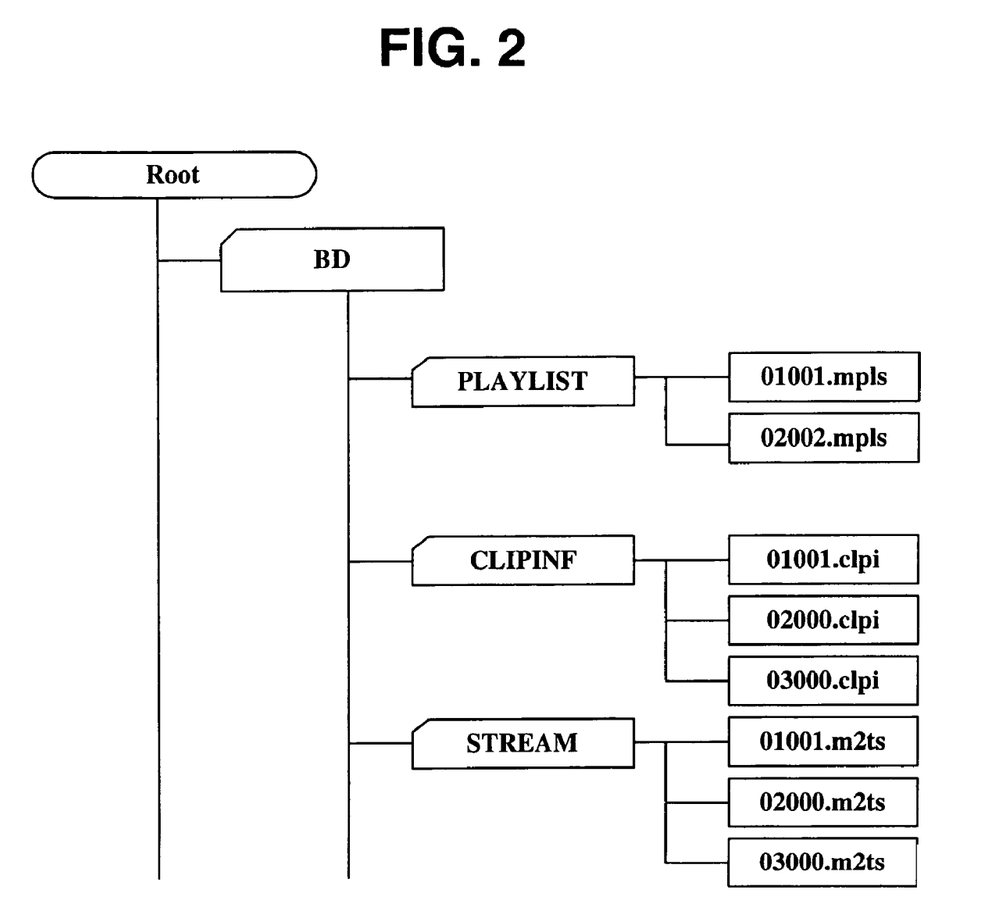
FIG. 2 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 2. Some aspects of the data structure according to the present invention shown in FIG. 2 are the same as the well-known BD-RE standard, as such these aspects will not be described in great detail.

As shown in FIG. 2, the root directory contains at least one BD directory. The BD directory includes general files (not shown), a PLAYLIST directory in which playlist files (e.g.,

*.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted single-path and/or multi-path A/V stream files that are called clips or clip files. The A/V stream includes source packets of video and audio.

For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis).

Expressed another way, the playlist file identifies playitems, each playitem points to a clip or portion thereof and identifies the clip information file associated with the clip. The clip information file is used, among other things, to map the playitems to the clip of source packets.

The general files (not shown) provide general information for managing the reproduction of the A/V streams recorded on the optical disk.

In addition to illustrating the data structure of the recording medium according to an embodiment of the present invention, FIG. 2 represents the areas of the recording medium. For example, the general information files are recorded in one or more general information areas, the playlist directory is recorded in one or more playlist directory areas, each playlist in a playlist directory is recorded in one or more playlist areas of the recording medium, etc.

Figure 3:
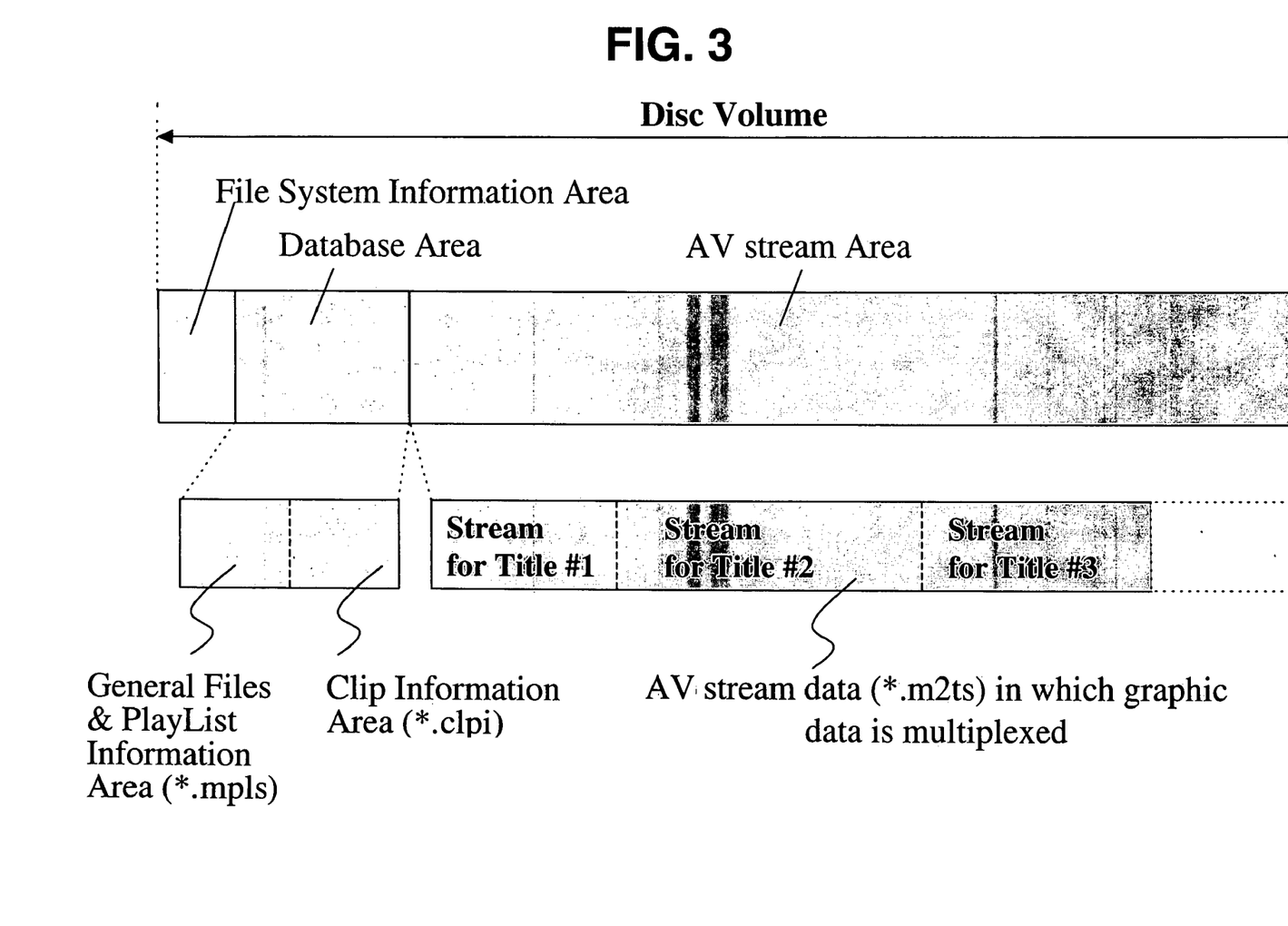
FIG. 3 illustrates an example of a recording medium having the data structure of FIG. 2 stored thereon.

FIG. 3 illustrates an example of a recording medium having the data structure of FIG. 2 stored thereon. As shown, the recording medium includes a file system information area, a data base area and an A/V stream area.

The data base area includes a general information file and playlist information area and a clip information area. The general information file and playlist information area have the general information files recorded in a general information file area thereof, and the PLAYLIST directory and playlist files recorded in a play list information area thereof. The clip information area has the CLIPINF directory and associated clip information files recorded therein. The A/V stream area has A/V streams and graphic data for the various titles recorded therein.

Video and audio data are typically organized as individual titles; for example, different movies represented by the video and audio data are organized as different titles. Furthermore, a title may be organized into individual chapters in much the same way a book is often organized into chapters.

Figure 4:
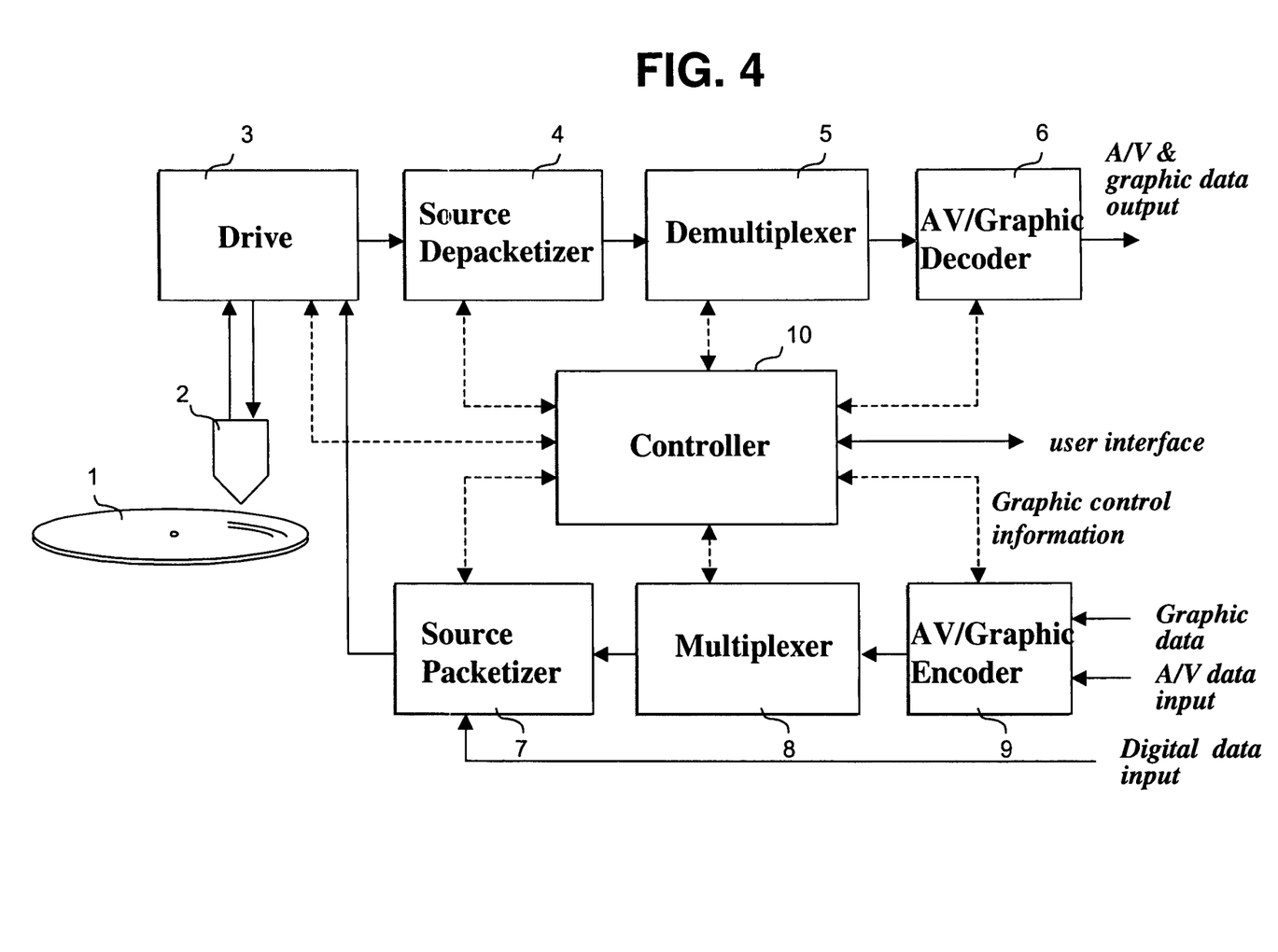
FIG. 4 is diagram illustrating the structure of an optical disc apparatus where a method for reproducing/recording a multipath data stream according to the present invention is applied.

FIG. 4 illustrates a schematic diagram of an embodiment of an optical disk recording and reproducing apparatus according to the present invention. As shown, an AV/Graphic encoder 9 receives and encodes data (e.g., movie video and audio data, bitmap-formatted graphic images, and their positions, colors and display effect control information, etc.) into PES packets. The AV/Graphic encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video/graphic format of the optical disk.

The above-mentioned control information about positions, colors and display effects of graphic images may be entered through user's inputs to a controller 10 and then delivered to the AV/Graphic encoder 9.

As shown in FIG. 4, the operations of the AV/Graphic encoder 9, the multiplexer 8 and the source packetizer 7 are controlled by the controller 10. The controller 10 receives user input on the recording operation, and provides control information to AV/Graphic encoder 9, multiplexer 8 and the source packetizer 7. For example, the controller 10 instructs the AV/Graphic encoder 9 on the type of encoding to perform, instructs the multiplexer 8 on the transport stream to create, and instructs the source packetizer 7 on the source packet format. The controller 10 further controls a drive 3 to record on the optical disk the output from the source packetizer 7 as a single clip file.

The single clip file includes video and audio data and graphic-related data (graphic images, their positions, colors and display effect information) that are interleaved each other in the form of TS.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 2 and 3 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

For example, as mentioned above with respect to the embodiments of the present invention, an A/V and graphic-related data stream included in a single clip file is reproduced based on the navigation information.

The reproduced source packets of an A/V stream and a graphic-related data stream are received by a source depacketizer 4 and converted into appropriate data stream (e.g., an MPEG-2 transport packet stream). A demultiplexer 5 demultiplexes the respective data streams into PES packet-encoded data of video, audio and graphic. An AV/Graphic decoder 6 decodes the encoded data encapsulated in PES packets to produce the original data that was fed to the AV/Graphic encoder 9 or to produce video with which graphic images are sometimes overlapped.

During reproduction, the controller 10 controls the operation of the source depacketizer 4, demultiplexer 5 and AV/Graphic decoder 6. The controller 10 receives user input on the reproducing operation, and provides control information to AV/Graphic decoder 6, demultiplexer 5 and the source depacketizer 4. For example, the controller 10 instructs the AV/Graphic decoder 9 on the type of decoding to perform, instructs the demultiplexer 5 on the transport stream to demultiplex, and instructs the source depacketizer 4 on the source packet format.

While FIG. 4 has been described as a recording and reproducing apparatus, it will be understood that only a recording or only a reproducing apparatus may be provided using those portions of FIG. 4 providing the recording or reproducing function.

The embodiments to organize the graphic-related data into a PES packet are described hereinafter.

The organization of graphic-related data to a PES packet is made by main operation of the controller 10 in cooperation with the AV/Graphic encoder 9. However, the AV/Graphic encoder 9 can organize a PES packet by itself if necessary information for display control related with inputted graphic images are directly received.

Figure 5A:
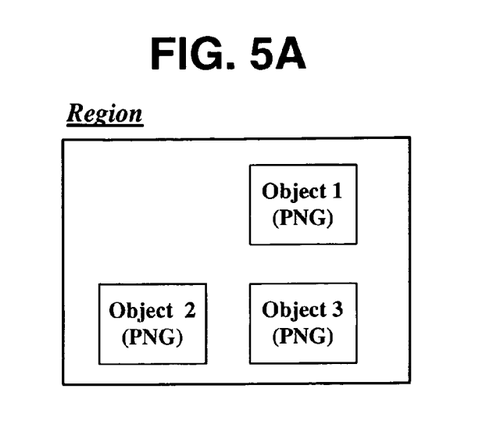
FIG. 5A illustrates a region including several graphic objects.

A single PES packet includes graphic-related data to be displayed on a single video frame (also called a 'page' hereinafter). One or more graphic regions are included in a single page and each graphic region includes at least one graphic image (called an 'object' hereinafter), e.g., PNG (Portable Network Graphic)-formatted image, as shown in FIG. 5A.

Figure 5B:
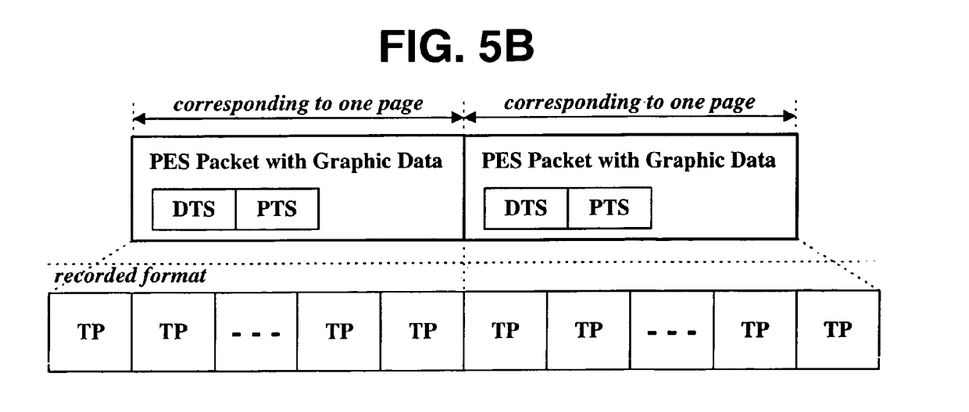
FIG. 5B illustrates relations among graphic objects to be displayed on one video page, PES packets carrying them, and a series of transport packets to be recorded.

The time information of PTS (Presentation Time Stamp) and DTS (Decoding Time Stamp) for included objects is inserted in each PES packet corresponding to one page by the AV/Graphic encoder 9, as shown in FIG. 5B.

Figure 6:
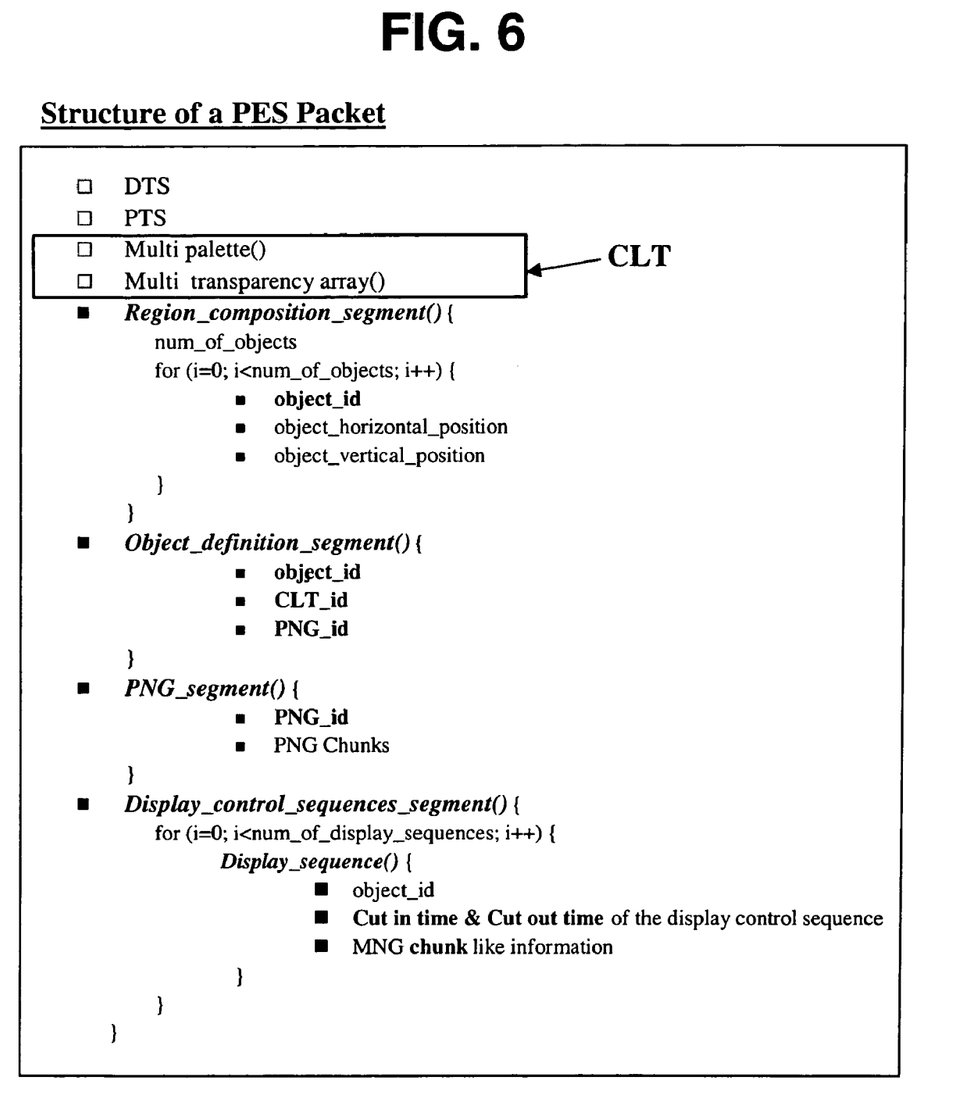
FIG. 6 illustrates the structure of a PES packet in accordance with a first embodiment of the present invention.

FIG. 6 illustrates the structure of a PES packet organized by the controller 10 and the AV/Graphic encoder 9 in accordance with a first embodiment of the present invention. As shown, the PES packet includes DTS (Decoding Time Stamp) for specifying the decoding time of graphic objects, PTS (Presentation Time Stamp) for specifying the presentation time of the graphic objects, and a plurality of color lookup tables (CLTs) that specify colors of graphic objects. Each CLT is composed of a palette member and a transparency array member that specify color and transparent level, respectively, of an object or objects. Because a PES packet includes a plurality of CLTs the graphic objects included in the PES packet can be associated with different CLTs.

The PES packet further includes region composition segments (RCSs), object definition segments (ODSs), PNG segments, and display control sequence segments (DCSSs).

Each RCS includes the number of objects included therein, ID of each object, and information about the horizontal/vertical position at which each object is to be displayed. Each ODS includes an object ID, ID of an associated CLT, and PNG ID to identify a graphic image. Each PNG segment includes a PNG ID and a PNG chunk corresponding to an object image. Each DCSS includes display sequences of objects.

Each display sequence includes the object ID, cut-in time and cut-out time information for display lasting time of the object, and multiple network graphic (MNG) chunk information.

In the above embodiment of FIG. 6, different object IDs can be assigned to same shaped images that are displayed on same screen location. For example, a normal state button, a selected state one, and an action state one have same image altogether, however they need to be differently displayed in each state. Therefore, if three ODSs for the three-stated single button have different object IDs, different CLT IDs, and same PNG ID, respectively, the button can be displayed in different colors according to different states.

Figure 7:
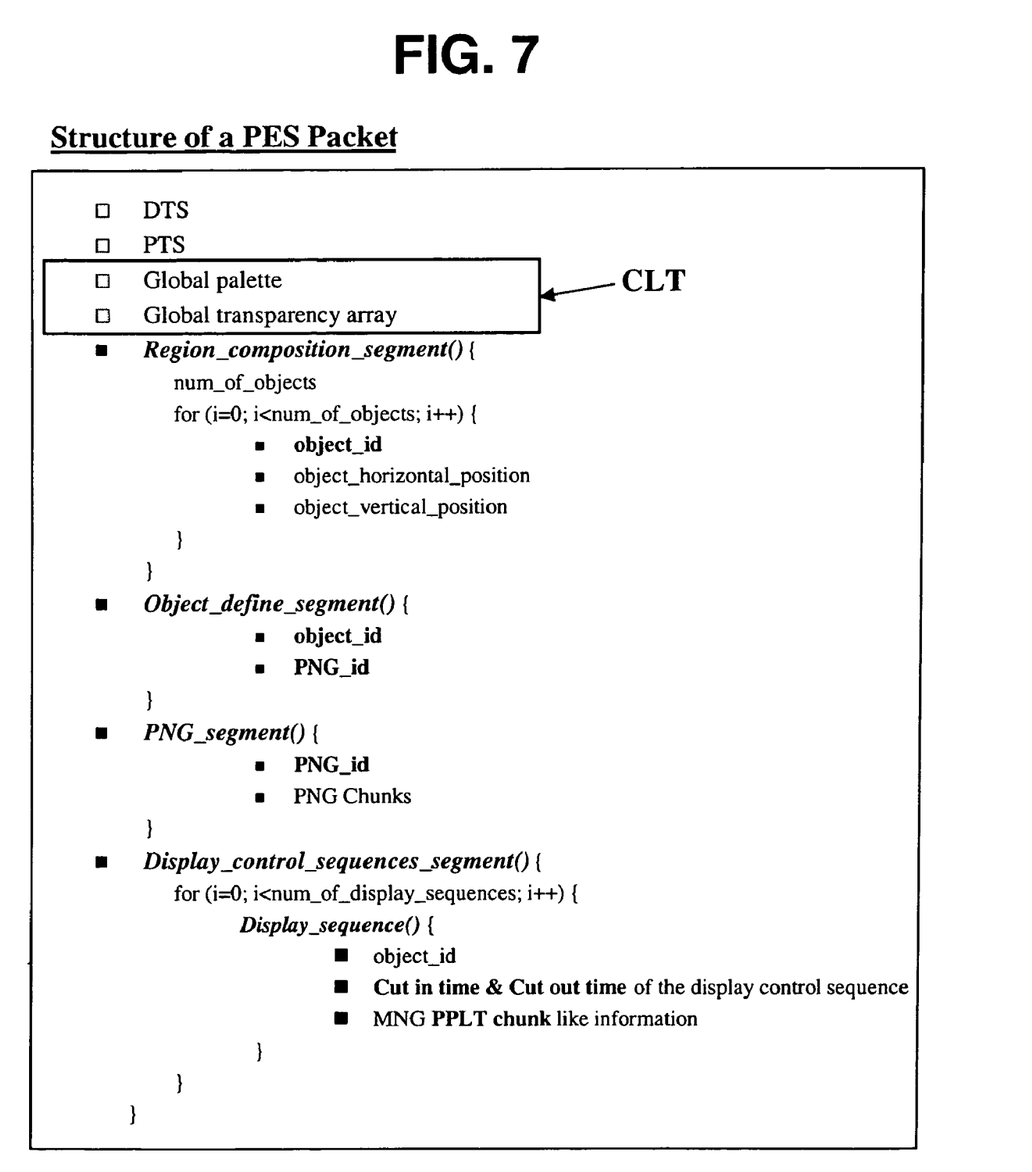
FIG. 7 illustrates the structure of a PES packet in accordance with a second embodiment of the present invention.

FIG. 7 illustrates the structure of a PES packet organized by the controller 10 and the AV/Graphic encoder 9 in accordance with a second embodiment of the present invention. As shown, the PES packet includes DTS for specifying the decoding time of graphic objects, PTS for specifying the presentation time of the graphic objects, and a single global CLT that specifies color of all graphic objects. The global CLT is composed of a palette member and a transparency array member that specify color and transparent level, respectively, of all objects.

The PES packet further includes region composition segments (RCSs), object definition segments (ODSs), PNG segments, and display control sequence segments (DCSSs).

Each RCS includes the number of objects included therein, ID of each object, and information about the horizontal/vertical position at which each object is to be displayed. Each, ODS includes an object ID, and PNG ID to identify a graphic image. Because the global CLT is used in common, the ODS does not include CLT ID. Each PNG segment includes a PNG ID and a PNG chunk corresponding to an object image. Each DCSS includes display sequences of objects.

Each display sequence includes an object ID, cut-in time and cut-out time information for display lasting time of the object, and multiple network graphic (MNG) partial palette chunk information.

Because all objects use the same CLT in the second embodiment, the MNG partial palette chunk information is recorded to be used to change palette partially in order that an image object might be partially changed in color or display effect for outstanding display.

Figure 8:
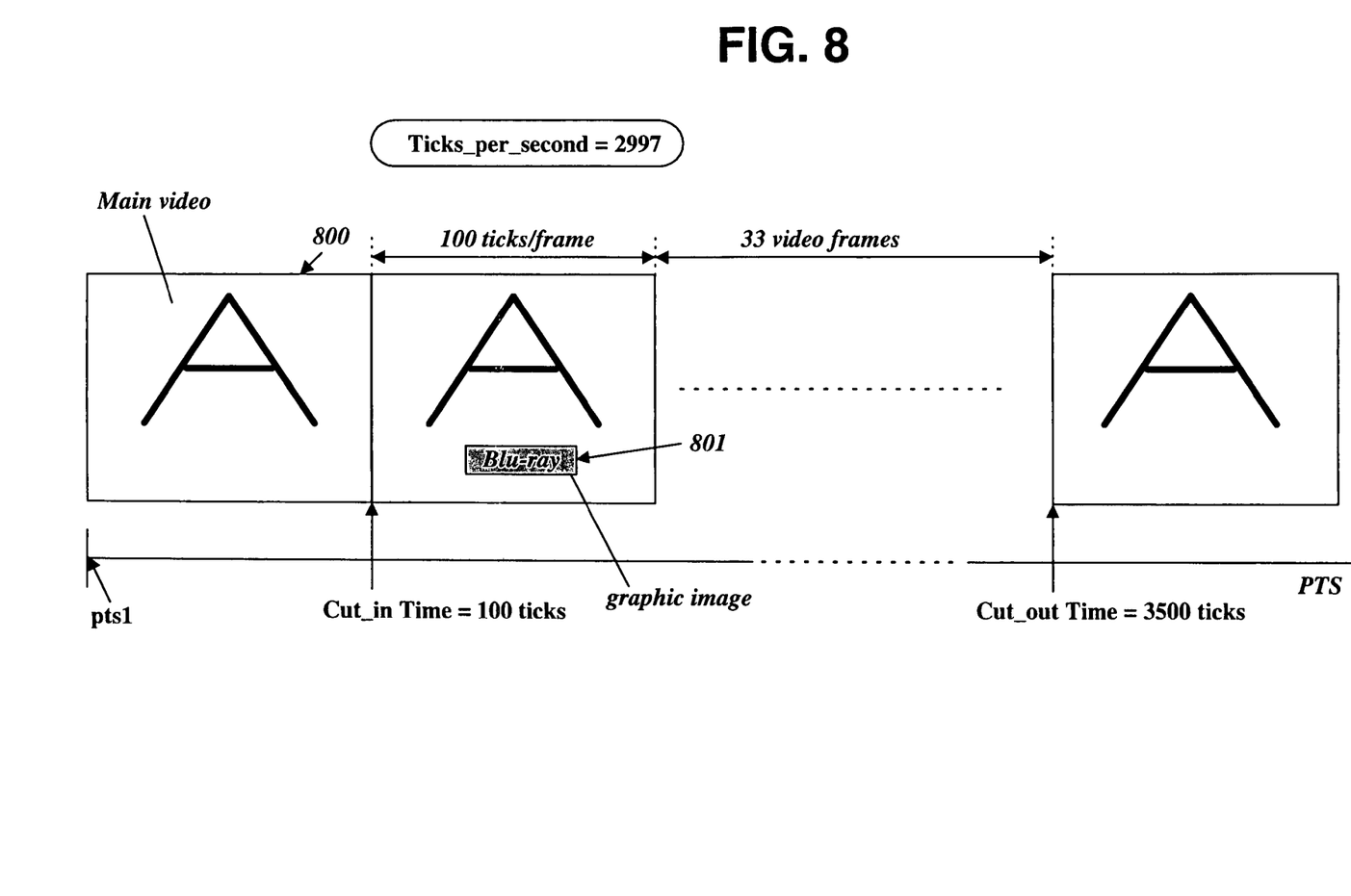
FIG. 8 illustrates a graphic object that keeps to be displayed on a main video for an interval specified by the cut-in and cut-out time in accordance with the present invention.

The cut-in time and cut-out time for display effects are defined in relative time with respect to the PTS written in a PES packet as shown in FIG. 8.

As explained above, the cut-in time is time information to show subtitle such as a graphic object, and the cut-out time is time information to make a graphic object disappear. The time information is expressed in ticks. The ticks are ordinarily used in display of MNG-formatted images in synchronization of a main video frame. The expression in ticks provides better synchronization between a main video frame and its related graphic objects.

For example, if a field of ticks per second is defined to 2997 and a video frame interval is defined to 100 ticks, the frame rate becomes 29.97 Hz (=2997 (ticks/sec)/100 (ticks/frame)).

In the example of FIG. 8, because the cut-in and cut-out time for a graphic object 801 including a text "Blu-ray" are respectively set to 100 and 3500 expressed in not physical time but the number of ticks, the graphic object 801 is displayed just a frame after its main video 800 whose PTS is set to pts1 is presented. Then, the object 801 keeps displayed state for 34 video frames and disappears at the 35-th video frame.

The above-explained method and apparatus of recording graphic data on a high-density recording medium in accordance with the present invention ensures effective recording of graphic images e.g., icons for reproduction control and/or auxiliary information windows for video contents recorded on a recording medium. Furthermore, the present method is capable of minimizing the size of graphic related data if color control information is used in common for a plurality of graphic objects.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method of recording graphic data on a recording medium, comprising:

receiving graphic data including a plurality of graphic objects; and organizing the plurality of graphic objects and color control information into a PES (Packetized Elementary Stream) packet and recording the PES packet on the recording medium, wherein the color control information is used in common for screen display by the plurality of graphic objects so that the graphic objects are changed in color or display effects by using the common color control information.

2. The method of claim 1, wherein the plurality of graphic objects are an object set that is to be displayed on a single video page.

3. The method of claim 1, wherein the color control information includes a global palette table and a global transparency array that defines transparent grade of every graphic object included in the PES packet.

4. The method of claim 1, wherein said organizing step slices the PES packet, converts each slice to a transport packet and records the transport packets on the recording medium.

5. The method of claim 4, wherein said organizing step further converts inputted video and/or audio stream to transport packets, and multiplexes the converted video and/or audio stream with the transport packets including the graphic objects and recording the multiplexed transport packets on the recording medium.

6. The method of claim 1, wherein said organizing step inserts a decoding time stamp (DTS) and a presentation time stamp (PTS) for the graphic objects while organizing the PES packet.

7. The method of claim 1, wherein said organizing step inserts display effect information for at least one graphic object while organizing the PES packet.

8. The method of claim 7, wherein said display effect information includes time information of display start and end of any of the graphic objects.

9. The method of claim 8, wherein the time information is expressed in the number of ticks and has value of a multiple of N ticks where the N is the number of ticks for while a single video frame keeps displayed.

10. The method of claim 1, wherein a structure for one of the graphic objects comprises an ID of object, an ID of actual image data, and actual image data.

11. A computer readable medium having an executable data structure recorded thereon for managing reproduction of images by a reproducing device, comprising:

a data area storing video and/or audio and graphic data in the form of transport packets, a PES (Packetized Elementary Stream) packet made from some of the transport packets containing the graphic data includes a plurality of graphic objects and color control information that is used in common for screen display by the plurality of graphic objects; and an information area storing information files for managing reproduction of the video and/or audio and graphic data by the reproducing device so that the graphic objects are changed in color or display effects by using the common color control information.

12. The computer readable medium of claim 11, wherein the plurality of graphic objects are an object set that is to be displayed on a single video page.

13. The computer readable medium of claim 11, wherein the color control information includes a global palette table and a global transparency array that defines transparent grade of every graphic object included in the PES packet.

14. The computer readable medium of claim 11, wherein the PES packet includes a decoding time stamp (DTS) and a presentation time stamp (PTS) for the included graphic objects.

15. The computer readable medium of claim 11, wherein the PES packet comprises display effect information for at least one graphic object included therein.

16. The computer readable medium of claim 15, wherein said display effect information includes time information of display start and end of any of the graphic objects.

17. The computer readable medium of claim 11, wherein a structure for one of the graphic objects comprises an ID of object, an ID of actual image data, and actual image data.

18. An apparatus of recording graphic data on a recording medium, comprising:

a receiving unit configured to receive video and/or audio data, and graphic data including a plurality of graphic objects;

a packetizer configured to organize the video and/or audio data into a series of PES (Packetized Elementary Stream) packets and to organize the received plurality of graphic objects and color control information into a PES packet, wherein the color control information is used in common for screen display by the plurality of graphic objects; and a multiplexer configured to multiplex the series of video and/or audio PES packets and the PES packet including graphic objects in the unit of transport packet; and a driver configured to record the unit of transport packet on a recording medium so that the graphic objects are changed in color or display effects by using the common color control information.

19. The apparatus of claim 18, wherein the plurality of graphic objects are an object set that is to be displayed on a single video page.

20. The apparatus of claim 18, wherein the color control information includes a global palette table and a global transparency array that defines transparent grade of every graphic object included in the PES packet.

21. The apparatus of claim 18, wherein said packetizer inserts a decoding time stamp (DTS) and a presentation time stamp (PTS) for the graphic objects while organizing the PES packet with graphic objects.

22. The apparatus of claim 18, wherein said packetizer inserts time information on display start and end of any of the graphic objects while organizing the PES packet with graphic objects.

23. The recording medium of claim 18, wherein a structure for one of the graphic objects comprises an ID of object, an ID of actual image data, and actual image data.

24. A method of reproducing graphic data on a recording medium, comprising:

reproducing a PES (Packetized Elementary Stream) packet from the recording medium, the PES packet including a plurality of graphic objects and color information organized into the PES packet, wherein the color information is used in common for screen display by the plurality of graphic objects so that the graphic objects are changed in color or display effects by using the common color control information.

25. The method of claim 24, wherein the plurality of graphic objects are an object set that is to be displayed on a single video page.

26. The method of claim 24, wherein the color control information includes a global palette table and a global transparency array that defines transparent grade of every graphic object included in the PES packet.

27. An apparatus for recording graphic data on a recording medium, comprising:

an optical recording device configured to record data on the recording medium; and a controller configured to control the optical recording device to record video and/or audio data, and graphic data including a plurality of graphic objects on the recording medium, the video and/or audio data organized into a series of PES (Packetized Elementary Stream) packets and the plurality of graphic objects and color control information organized into a PES packet, wherein the color information is used in common for screen display by the plurality of graphic objects, and the series of video and/or audio PES packets and the PES packet including graphic objects are multiplexed in the unit of transport packet so that the graphic objects are changed in color or display effects by using the common color control information.

28. The apparatus of claim 27, wherein the plurality of graphic objects are an object set that is to be displayed on a single video page.

29. The apparatus of claim 27, wherein the color control information includes a global palette table and a global transparency array that defines transparent grade of every graphic object included in the PES packet.

30. An apparatus for reproducing graphic data on a recording medium, comprising:

an optical reproducing device configured to reproduce data on the recording medium;

a controller configured to control the optical reproducing device to reproduce video and/or audio data, and graphic data including a plurality of graphic objects from the recording medium, the video and/or audio data organized into a series of PES (Packetized Elementary Stream) packets and the plurality of graphic objects and color control information organized into a PES packet, wherein the color information is used in common for screen display by the plurality of graphic objects, and the series of video and/or audio PES packets and the PES packet including graphic objects are multiplexed in the unit of transport packet so that the graphic objects are changed in color or display effects by using the common color control information.

31. The apparatus of claim 30, wherein the plurality of graphic objects are an object set that is to be displayed on a single video page.

32. The apparatus of claim 30, wherein the color control information includes a global palette table and a global transparency array that defines transparent grade of every graphic object included in the PES packet.

* * * * *

UNITED STATES PATENT AND TRADEMARK OFFICE
CERTIFICATE OF CORRECTION

| | | |
|---|---|---|
| PATENT NO. | : 7,609,943 B2 | Page 1 of 1 |
| APPLICATION NO. | : 10/759269 | |
| DATED | : October 27, 2009 | |
| INVENTOR(S) | : Kang Soo Seo et al. | |

It is certified that error appears in the above-identified patent and that said Letters Patent is hereby corrected as shown below:

In claim 24 at column 8, line 55, please change "color information" to --color control information--.

In claim 24 at column 8, line 56, please change "color information" to --color control information--.

In claim 27 at column 9, line 13, please change "color information" to --color control information--.

In claim 30 at column 10, line 13, please change "color information" to --color control information--.

Signed and Sealed this

Twenty-sixth Day of January, 2010

David J. Kappos
*Director of the United States Patent and Trademark Office*